(12) United States Patent
Kim et al.

(10) Patent No.: US 11,399,676 B2
(45) Date of Patent: Aug. 2, 2022

(54) CLEANER HOLDER

(71) Applicant: LG ELECTRONICS INC., Seoul (KR)

(72) Inventors: Namhee Kim, Seoul (KR); Bohyun Nam, Seoul (KR); Jungbae Hwang, Seoul (KR); Jinju Kim, Seoul (KR); Sehwan Bae, Seoul (KR)

(73) Assignee: LG Electronics Inc., Seoul (KR)

( * ) Notice: Subject to any disclaimer, the term of this patent is extended or adjusted under 35 U.S.C. 154(b) by 499 days.

(21) Appl. No.: 16/360,571

(22) Filed: Mar. 21, 2019

(65) Prior Publication Data

US 2019/0274506 A1 Sep. 12, 2019

Related U.S. Application Data

(63) Continuation of application No. 15/589,616, filed on May 8, 2017, now Pat. No. 10,405,719.

(30) Foreign Application Priority Data

May 9, 2016 (KR) .................. 10-2016-0056462
Aug. 25, 2016 (KR) .................. 10-2016-0108641

(51) Int. Cl.
*A47L 9/00* (2006.01)
*A47L 5/24* (2006.01)
(Continued)

(52) U.S. Cl.
CPC ............. *A47L 9/0063* (2013.01); *A47L 5/225* (2013.01); *A47L 5/24* (2013.01); *A47L 5/26* (2013.01);
(Continued)

(58) Field of Classification Search
CPC .......... A47L 9/0063; A47L 5/225; A47L 5/24; A47L 5/26; A47L 5/38; A47L 9/0027;
(Continued)

(56) References Cited

U.S. PATENT DOCUMENTS 1,041,314 A 10/1912 Mahlstedt
5,926,909 A 7/1999 McGee
(Continued)

FOREIGN PATENT DOCUMENTS

CN 1293942 5/2001
CN 1323564 11/2001
(Continued)

OTHER PUBLICATIONS

Machine translation JP 2014124443 (Year: 2014).*
(Continued)

*Primary Examiner* — Monica S Carter
*Assistant Examiner* — Alberto Saenz
(74) *Attorney, Agent, or Firm* — Fish & Richardson P.C.

(57) ABSTRACT

A cleaner holder includes a first body having a charging terminal to charge a cleaner; a second body connected to the first body, configured to support the cleaner and having an accommodation space in which a battery is accommodated; and a locking part rotatably connected to the first body and configured to fix the cleaner, wherein when force having predetermined magnitude is applied to the locking part in one direction, the locking part is rotated in a first direction to be coupled to the cleaner, so that the cleaner is fixed, and wherein when force having predetermined magnitude is applied to the locking part in the other direction, the locking part is rotated in a second direction opposite to the first direction to be uncoupled from the clean.

11 Claims, 24 Drawing Sheets

(51) Int. Cl.
*A47L 5/22* (2006.01)
*A47L 5/26* (2006.01)
*A47L 5/38* (2006.01)
*A47L 9/28* (2006.01)
*A47L 5/00* (2006.01)
*H02J 7/00* (2006.01)
*H01M 10/46* (2006.01)
*H01M 50/209* (2021.01)
*H01M 50/543* (2021.01)

(52) U.S. Cl.
CPC ............... *A47L 5/38* (2013.01); *A47L 9/0027* (2013.01); *A47L 9/0054* (2013.01); *A47L 9/2873* (2013.01); *A47L 9/2884* (2013.01); *H01M 10/46* (2013.01); *H01M 50/209* (2021.01); *H01M 50/543* (2021.01); *H02J 7/0044* (2013.01); *H02J 7/0045* (2013.01); *A47L 5/00* (2013.01); *A47L 9/00* (2013.01); *H02J 7/0047* (2013.01); *H02J 7/0048* (2020.01)

(58) Field of Classification Search
CPC .... A47L 9/0054; A47L 9/2873; A47L 9/2884; A47L 5/00; A47L 9/00; H01M 50/209; H01M 50/543; H01M 10/46; H02J 7/0044; H02J 7/0045; H02J 7/0048
USPC ......................................................... 15/320
See application file for complete search history.

(56) References Cited

U.S. PATENT DOCUMENTS

| | | | |
|---|---|---|---|
| 7,594,945 | B2 | 9/2009 | Kim et al. |
| 8,302,250 | B2 | 11/2012 | Dyson et al. |
| 8,414,670 | B2 | 4/2013 | Lee |
| 9,155,431 | B2 * | 10/2015 | Dyson .................. A47L 9/0063 |
| 9,675,218 | B2 | 6/2017 | Kim et al. |
| 9,757,001 | B2 | 9/2017 | Hwang et al. |
| 10,405,719 | B2 * | 9/2019 | Kim .......................... A47L 5/26 |
| 10,413,142 | B2 | 9/2019 | Hwang et al. |
| 10,660,493 | B2 | 5/2020 | Kim et al. |
| 2004/0135541 | A1 | 7/2004 | Cho et al. |
| 2005/0166352 | A1 | 8/2005 | Keppler et al. |
| 2006/0272300 | A1 | 12/2006 | Kim et al. |
| 2007/0094837 | A1 | 5/2007 | Jeon et al. |
| 2011/0219566 | A1 | 9/2011 | Dyson et al. |
| 2011/0219571 | A1 | 9/2011 | Dyson et al. |
| 2013/0328523 | A1 | 12/2013 | Dyson et al. |
| 2013/0335900 | A1 | 12/2013 | Jang |
| 2015/0135470 | A1 * | 5/2015 | Mantyla ................ A47L 9/2873 15/301 |
| 2015/0320284 | A1 | 11/2015 | Ha et al. |
| 2016/0051109 | A1 | 2/2016 | Hwang |
| 2016/0088987 | A1 | 3/2016 | Hwang et al. |
| 2016/0174787 | A1 | 6/2016 | Conrad |
| 2017/0319034 | A1 | 11/2017 | Kim et al. |
| 2017/0319035 | A1 | 11/2017 | Kim et al. |
| 2017/0319036 | A1 | 11/2017 | Kim et al. |
| 2017/0319037 | A1 | 11/2017 | Kim et al. |
| 2017/0319038 | A1 | 11/2017 | Kim et al. |
| 2018/0125314 | A1 | 5/2018 | Kim et al. |
| 2021/0045604 | A1 * | 2/2021 | Lee ....................... A47L 9/2873 |

FOREIGN PATENT DOCUMENTS

| | | |
|---|---|---|
| CN | 1323565 A | 11/2001 |
| CN | 2798172 | 7/2006 |
| CN | 1871987 | 12/2006 |
| CN | 1951310 | 4/2007 |
| CN | 1954757 | 5/2007 |
| CN | 101357051 | 2/2009 |
| CN | 101489458 | 7/2009 |
| CN | 102188188 | 9/2011 |
| CN | 202840553 | 3/2013 |
| CN | 103327865 | 9/2013 |
| CN | 103479296 | 1/2014 |
| CN | 104224044 | 12/2014 |
| CN | 204192519 | 3/2015 |
| CN | 104519777 | 4/2015 |
| CN | 105395132 | 3/2016 |
| CN | 105455725 | 4/2016 |
| CN | 205162974 | 4/2016 |
| CN | 205162975 | 4/2016 |
| CN | 205162976 | 4/2016 |
| DE | 102010038095 | 4/2012 |
| EP | 3033982 | 6/2016 |
| GB | 2441962 | 3/2008 |
| JP | S4965558 | 6/1974 |
| JP | S52006318 | 1/1977 |
| JP | S53157568 | 12/1978 |
| JP | S57112755 | 7/1981 |
| JP | S61164894 | 10/1986 |
| JP | S62290428 | 12/1987 |
| JP | 63143260 | 9/1988 |
| JP | H01209929 | 8/1989 |
| JP | H03272720 | 12/1991 |
| JP | H0584161 | 4/1993 |
| JP | 3015517 | 3/1995 |
| JP | H07154460 | 6/1995 |
| JP | H0936565 | 2/1997 |
| JP | H11205427 | 7/1999 |
| JP | 2000040534 | 2/2000 |
| JP | 2001095168 | 4/2001 |
| JP | 2001149289 | 6/2001 |
| JP | 2001212052 | 8/2001 |
| JP | 2001321310 | 11/2001 |
| JP | 2001353112 | 12/2001 |
| JP | 2003324503 | 11/2003 |
| JP | 2004121469 | 4/2004 |
| JP | 2004241342 | 8/2004 |
| JP | 2004283327 | 10/2004 |
| JP | 2005073143 | 3/2005 |
| JP | 2007190289 | 8/2007 |
| JP | 2011189132 | 9/2011 |
| JP | 2014124443 | 7/2014 |
| JP | 2014124443 A * | 7/2014 |
| JP | 2014200379 | 10/2014 |
| JP | 2014200379 A * | 10/2014 |
| JP | 2015012946 | 1/2015 |
| JP | 2015119879 | 7/2015 |
| JP | 2015134131 | 7/2015 |
| JP | 2016021999 | 2/2016 |
| JP | 2016116850 | 6/2016 |
| JP | 2019514595 | 6/2019 |
| JP | 2019514596 | 6/2019 |
| KR | 20-1998-0018401 | 7/1998 |
| KR | 200194997 | 9/2000 |
| KR | 200246448 | 10/2001 |
| KR | 10-2003-0041568 | 5/2003 |
| KR | 100614320 | 8/2006 |
| KR | 100657736 | 12/2006 |
| KR | 10-2012-0103956 | 9/2012 |
| KR | 10-2012-0103964 | 9/2012 |
| KR | 1020120103956 | 9/2012 |
| KR | 20160025245 | 3/2016 |
| KR | 1020160023134 | 3/2016 |
| KR | 10-2016-0023134 | 9/2017 |
| TW | 583342 | 4/2004 |
| WO | WO2010072150 | 7/2010 |
| WO | 2015129387 | 9/2015 |
| WO | 2016114038 | 7/2016 |
| WO | 2017101542 | 6/2017 |

OTHER PUBLICATIONS

Machine translation JP 2014200379 (Year: 2014).*
International Search Report in International Application No. PCT/KR2017/004735, dated Aug. 9, 2017, 3 pages (with partial English translation).

(56) References Cited

OTHER PUBLICATIONS

International Search Report in International Application No. PCT/KR2017/004740, dated Jul. 27, 2017, 3 pages (with partial English translation).
International Search Report in International Application No. PCT/KR2017/004392, dated Aug. 7, 2017, 3 pages (with partial English translation).
International Search Report in International Application No. PCT/KR2017/004391, dated Jul. 28, 2017, 3 pages (with partial English translation).
International Search Report in International Application No. PCT/KR2017/004278, dated Jun. 29, 2017, 3 pages (with partial English translation).
International Search Report in International Application No. PCT/KR2017/004276, dated Jun. 29, 2017, 3 pages (with partial English translation).
International Search Report in International Application No. PCT/KR2017/004741, dated Jul. 28, 2017, 3 pages (with partial English translation).
Australian Office Action in Australian Application No. 2020201842, dated Nov. 20, 2020, 6 pages.
JP Office Action in Japanese Appln. No. 2018-558753, dated Feb. 2, 2021, 9 pages (with English translation).
EP Supplementary Search Report in European Application No. EP17796305, dated Jan. 7, 2020, 3 pages.
Chinese Office Action in Chinese Appln. No. 201780026389.9, dated Dec. 29, 2020, 17 pages (with English translation).
Taiwanese Office Action in Taiwanese Appln. No. 106113811, dated Aug. 6, 2020, 9 pages (with English translation).
Chinese Office Action in Chinese Application No. 201780026389.9, dated May 8, 2020, 11 pages (with English translation).
Chinese Office Action in Chinese Application No. 201780028291.7, dated May 18, 2020, 10 pages (with English translation).
Japanese Office Action in Japanese Application No. 2018-558229, dated Jul. 7, 2020, 8 pages (with English translation).
KR Office Action in Korean Appln. No. 20-2021-0044175, dated Aug. 4, 2021, 12 pages (with English translation).
Extended European Search Report in European Appln. No. 21170646.0, dated Jun. 22, 2021, 7 pages.
Notice of Allowance in Japanese Appln. No. 2020-099956, dated Jul. 27, 2021, 5 pages (with English translation).
Office Action in U.S. Appl. No. 16/360,571, dated Jun. 15, 2021, 47 pages.
Office Action in Chinese Appln. No. 202110088034.0, dated Nov. 1, 2021, 12 pages (with English translation).
Office Action in Chinese Appln. No. 202110418780.1, dated Dec. 13, 2021, 17 pages (with English translation).
Notice of Allowance in Japanese Appln. No. 2018-558753, dated Apr. 26, 2022, 5 pages (with English translation).
Office Action in Japanese Appln. No. 2021-062941, dated May 17, 2022, 9 pages (with English Translation).

* cited by examiner

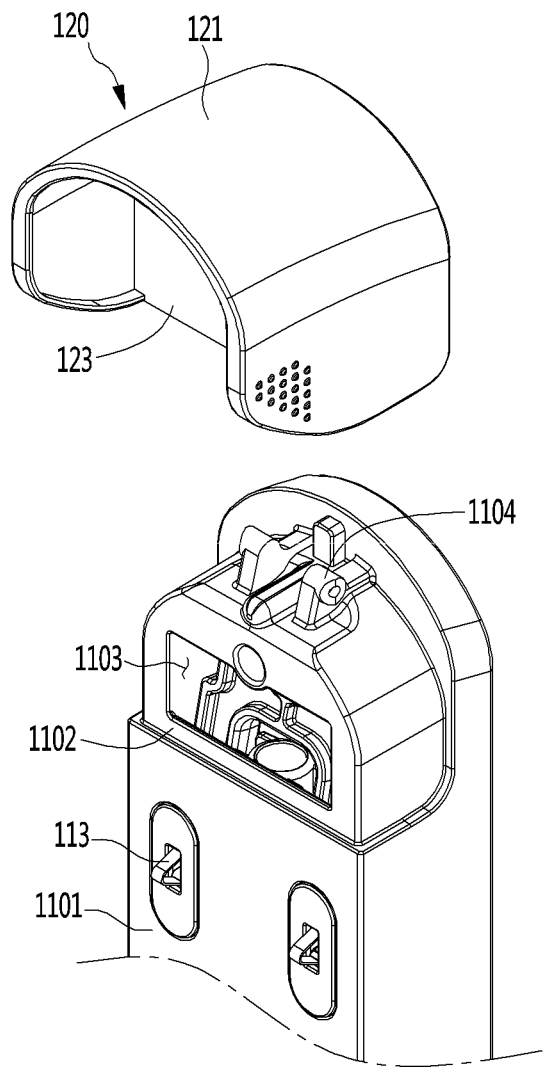

CLEANER HOLDER

CROSS-REFERENCE TO RELATED APPLICATIONS

This application is a continuation of U.S. application Ser. No. 15/589,616, filed on May 8, 2017, which claims benefit to Korean Patent Application No. 10-2016-0056462, filed in Korea on May 9, 2016, and Korean Patent Application No. 10-2016-0108641, filed in Korea on Aug. 25, 2016, whose entire disclosure is hereby incorporated by reference.

BACKGROUND

The present disclosure relates to a cleaner holder.

A cleaner is a device that performs cleaning by sucking and wiping dust or foreign substances on a surface to be cleaned.

Such a cleaner may be classified into a manual cleaner that performs cleaning while a user directly moves the cleaner and an automatic cleaner that performs cleaning while the cleaner is driven by itself. The manual cleaner may be classified into a canister cleaner, an upright cleaner, a handheld cleaner, a stick cleaner and the like depending on types of the cleaner.

The above-described cleaner may have a rechargeable battery embedded therein, and the rechargeable battery may supply electric power for operating the cleaner only when being frequently charged. Thus, the cleaner requires a holder that may simultaneously charge the rechargeable battery and hold the cleaner.

Contents of a vacuum cleaner charging stand are disclosed in Korean Patent Application Publication No. 10-2012-0103956 as the prior art.

The vacuum cleaner charging stand according to the prior art includes a pedestal for holding a head of a vacuum cleaner to simultaneously charge and hold the vacuum cleaner and a support having charging pins for charging the vacuum cleaner.

A charging stand according to the prior art includes a protruding support piece formed in a vertical direction to support a vacuum cleaner. However, because the protruding support piece according to the prior art is structured to be simply inserted into a lower side of a vacuum cleaner, it is difficult to stably support the vacuum cleaner.

SUMMARY

The present disclosure provides a cleaner holder for a cleaner, which has a separate fixed member that may fix a cleaner regardless of holding of the cleaner.

The present disclosure provides a cleaner holder for a cleaner, which may stably fix the cleaner by fixing an upper side and a lower side of the cleaner using a separate member.

A cleaner holder includes a first body having charging terminals configured to charge a cleaner; a second body connected to the first body, configured to support the cleaner and having an accommodation space in which a battery is accommodated; and a locking part rotatably connected to the first body and configured to fix the cleaner, wherein when force having predetermined magnitude is applied to the locking part in one direction, the locking part is rotated in a first direction to be coupled to the cleaner, so that the cleaner is fixed, and when force having predetermined magnitude is applied to the locking part in the other direction, the locking part is rotated in a second direction opposite to the first direction to be uncoupled from the cleaner.

A cleaner holder includes: a first body having a charging terminal configured to charge a cleaner; a second body connected to the first body, configured to support the cleaner and having an accommodation space in which a battery is accommodated; a first fixing member provided in the first body and coupled to a battery housing of the cleaner to be fixed to the cleaner; and a second fixing member provided in the second body and coupled to a dust container of the cleaner to be fixed to the cleaner, wherein a cleaner guide in contact with a dust container of the cleaner to guide movement of the cleaner is provided in the second body.

BRIEF DESCRIPTION OF THE DRAWINGS

Embodiments will be described in detail with reference to the following drawings in which like reference numerals refer to like elements, and wherein:

FIG. 7 is a view illustrating a state in which the locking part is separated from a first body;

DETAILED DESCRIPTION OF THE EMBODIMENTS

Figure 1:
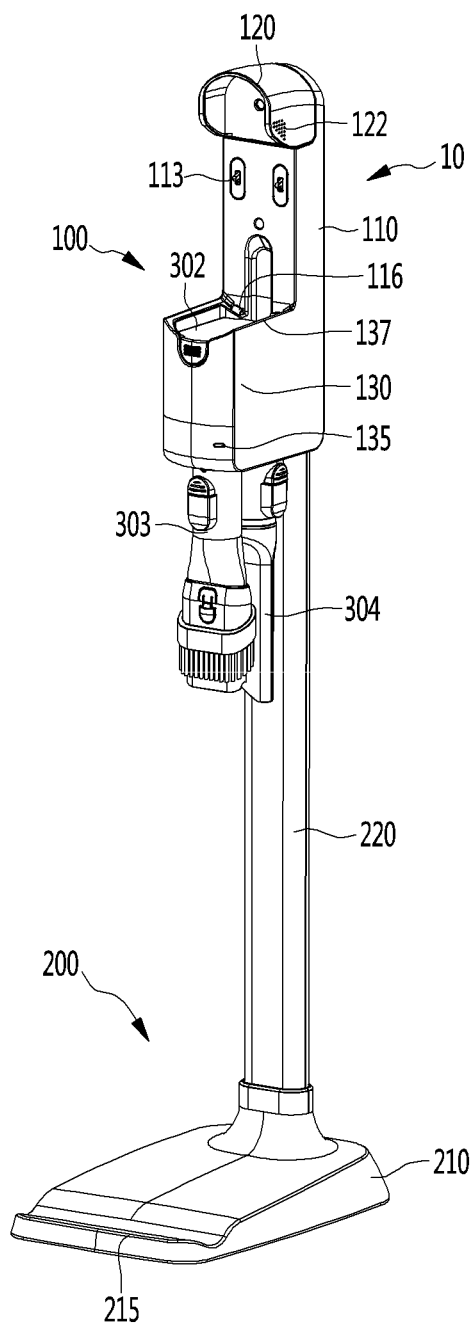
FIG. 1 is a perspective view illustrating a holder for a cleaner according to an embodiment of the present disclosure.

Hereinafter, some embodiments of the present disclosure will be described in detail with reference to the accompanying drawings. It should be noted that when components in the drawings are designated by reference numerals, the same components have the same reference numerals as far as possible even though the components are illustrated in different drawings. Further, in description of embodiments of the present disclosure, when it is determined that detailed descriptions of well-known configurations or functions disturb understanding of the embodiments of the present disclosure, the detailed descriptions will be omitted.

Also, in the description of the embodiments of the present disclosure, the terms such as first, second, A, B, (a) and (b) may be used. Each of the terms is merely used to distinguish the corresponding component from other components, and does not delimit an essence, an order or a sequence of the corresponding component. It should be understood that when one component is "connected", "coupled" or "joined" to another component, the former may be directly connected or jointed to the latter or may be "connected", coupled" or "joined" to the latter with a third component interposed therebetween.

Figure 2:
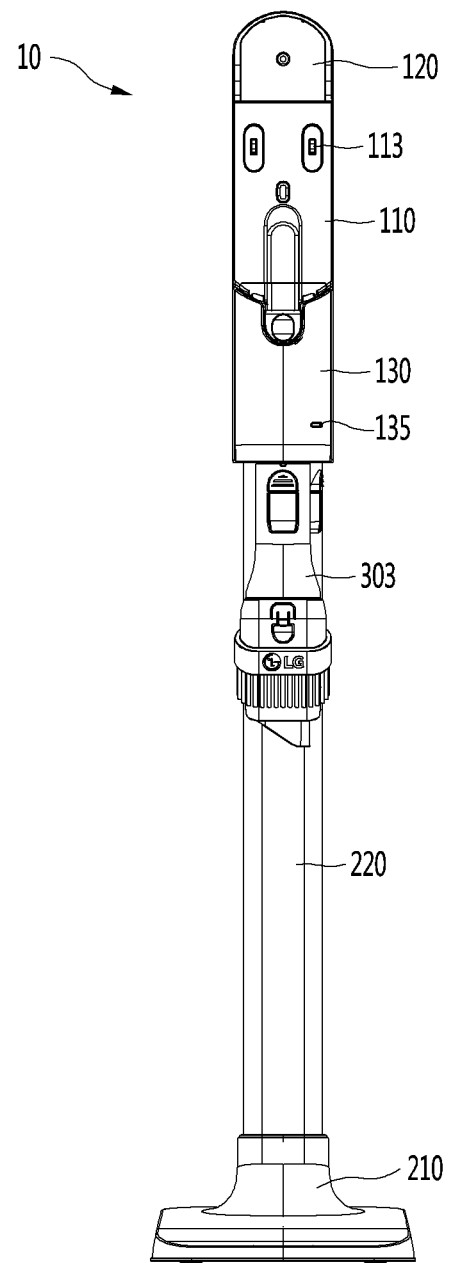
FIG. 2 is a front view of the holder for the cleaner of FIG. 1.
Figure 3:
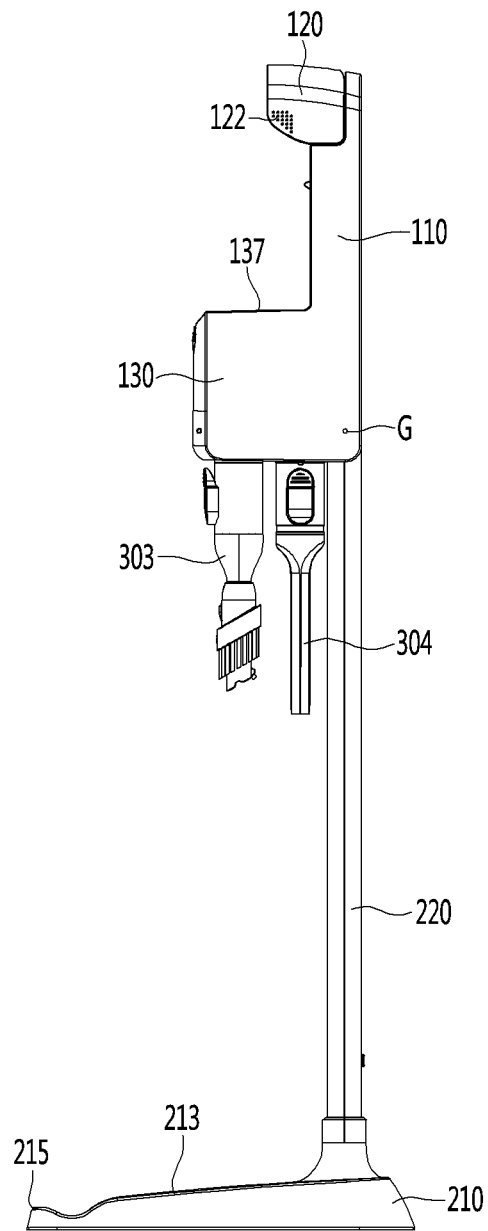
FIG. 3 is a side view illustrating the cleaner holder of FIG. 1.
Figure 4:
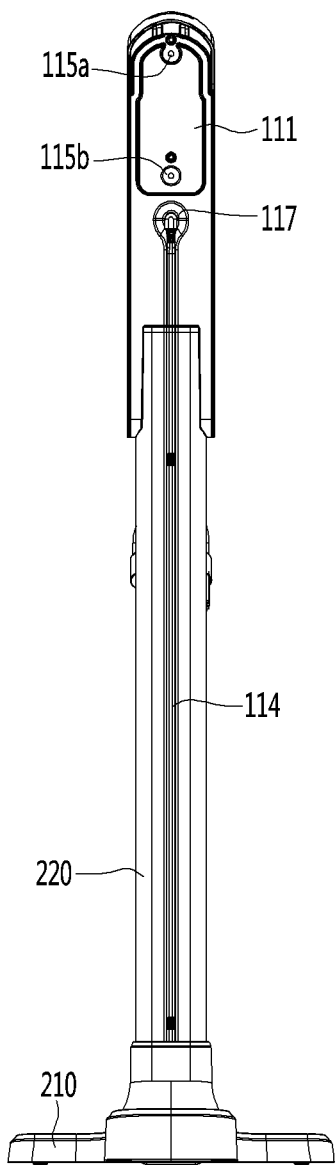
FIG. 4 is a rear view of the holder for the cleaner of FIG. 1.
Figure 5:
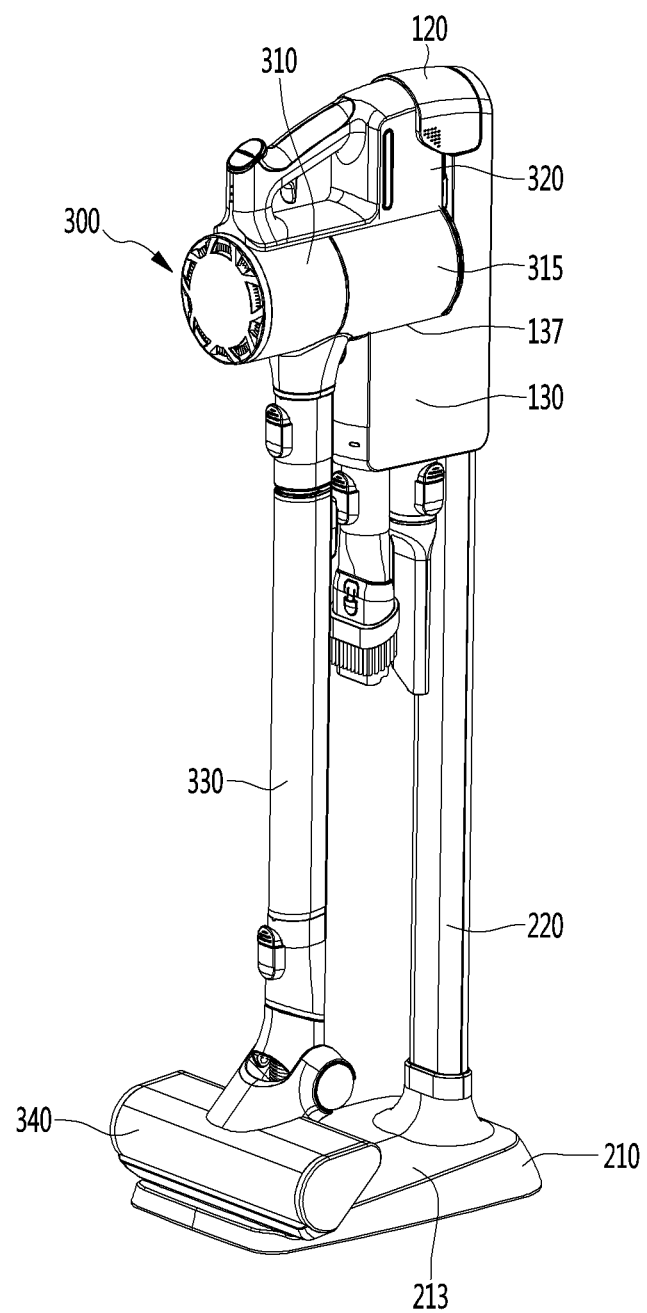
FIG. 5 is a view illustrating a state in which the cleaner is held on the holder.

FIG. 1 is a perspective view illustrating a cleaner holder according to an embodiment of the present disclosure, FIG. 2 is a front view illustrating the cleaner holder of FIG. 1, FIG. 3 is a side view illustrating the cleaner holder of FIG. 1, FIG. 4 is a rear view illustrating the cleaner holder of FIG. 1, and FIG. 5 is a view illustrating a state in which a cleaner is held on the cleaner holder.

Referring to FIGS. 1 to 5, a cleaner holder 10 according to the embodiment of the present disclosure includes a charging stand 100 for charging a battery of the cleaner 300. The charging stand 100 may simultaneously support the cleaner 300 and charge the battery provided in the cleaner 300.

The cleaner 300 may include a cleaner body 310 having a suction motor, a battery housing 320 in which the battery is accommodated, an extension tube 330 and a suction nozzle 340. The cleaner body 310 may include a dust separator 312 for separating dust and a dust container 314 in which the dust separated by the dust separator 312 are stored. External air may be introduced by suction force generated in the cleaner body 310 through the suction nozzle 340 and the extension tube 330 and may be moved to the dust container 314 provided in the cleaner body 310.

The charging stand 100 includes a first body 110.

The first body 110 includes a first charging port 113. The first charging port 113 may be in contact with terminals of the cleaner 300 to charge the battery provided in the cleaner 300.

The charging stand 100 includes a second body 130 in which an extra battery 302 is accommodated. The second body 130 is connected to the first body 110.

The second body 130 may protrude from the first body 110. As illustrated, the first body 110 and the second body 130 may be integrally formed. However, the present disclosure is not limited thereto.

The extra battery 302 may be detachably connected to the cleaner 300 to supply electric power for driving the cleaner 300. A second charging port 131 (see FIG. 19) configured to charge the extra battery 302 may be provided in the second body 130.

Charging of the cleaner 300 by the first charging port 113 and charging of the extra battery 302 by the second charging port 131 may be independently performed. In detail, the cleaner 300 and the extra battery 302 may be simultaneously charged. Otherwise, any one thereof may be charged and the other one thereof may be then charged. Further, the cleaner 300 and the extra battery 302 may be alternately charged.

As an example, after the cleaner 300 is completely charged by the first charging port 113, the extra battery 302 starts to be charged by the second charging port 131. As another example, after the extra battery 302 is completely charged by the second charging port 131, the cleaner 300 is completely charged by the first charging port 113.

Extra nozzles 303 and 304 may be coupled to the charging stand 100. The nozzles 303 and 304 may be attached/detached to/from the cleaner 300 or the like. In general, a cleaner may include a plurality of replaceable suction nozzles according to usage. Thus, it is inconvenient to store the suction nozzle that is not used. However, in this way, when the suction nozzles 303 and 304 are stored while being coupled to the charging stand 100, the risk of loss is reduced, and a user may easily use the same. The extra nozzles 303 and 304 may be named accessories.

Fixing members 116 for fixing the cleaner body 310 may be provided in the second body 130. The fixing members 116 may protrude from the second body 130. Further, as resilient members (not illustrated) are connected to the fixing members 116, respectively, the fixing members 116 may be selectively inserted into the second body 130 by external force. Meanwhile, the fixing members 116 may be provided not in the second body 130 but in the first body 110.

The fixing members 116 may be inserted into the cleaner body 310 to fix the cleaner body 310. Fixing grooves (not illustrated) into which the fixing members 116 are inserted may be formed in the cleaner body 310.

Meanwhile, although not illustrated, a manipulation button (not illustrated) for controlling insertion/withdrawal of the fixing members 116 may be provided in the charging stand 100. In detail, when a user pushes the manipulation button, the fixing members 116 and the cleaner body 310 may be decoupled as the fixing members 116 are inserted into the second body 130.

A cleaner guide 137 for guiding mounting of the cleaner body 310 may be provided in the second body 130. The cleaner guide 137 may be in parallel to a floor. The cleaner body 310 is guided rearward along the cleaner guide 137 to come into contact with the first charging port 113. The cleaner guide 137 may guide the cleaner body 310 and, at the same time, may support a weight of the cleaner body 310. As needed, the cleaner guide 137 may be named a "cleaner support 137". When the cleaner 300 is held on the cleaner guide 137, the extra battery 302 may be shielded so as not to be viewed from the outside. As illustrated, although the cleaner guide 137 and the second body 130 may be integrally formed, the present disclosure is not limited thereto.

The fixing members 116 may be provided at a rear end of the cleaner guide 137. Accordingly, the cleaner body 310 may be coupled to the fixing members 116 after being guided toward the first charging port 113 along the cleaner guide 137.

The charging stand 100 may further include a locking part 120 provided in the first body 110. The locking part 120 may be provided above the first body 110. The locking part 120 may be coupled to the cleaner 300 to stably fix the cleaner 300.

In detail, the locking part 120 may be coupled to the battery housing 320 to support the cleaner 300. An inner peripheral surface of the locking part 120 may have a shape corresponding to an outer peripheral surface of the battery housing 320 to surround the outer peripheral surface of the battery housing 320.

The user may selectively rotate the locking part 120 forward/rearward such that the locking part 120 may be coupled to the battery housing 320. The locking part 120 may include an anti-slide part 122 for providing friction force such that the user may easily grip the locking part 120. The anti-slide part 122 may include a plurality of bosses on an outer peripheral surface of the locking part 120.

The cleaner holder 10 may further include a stand 200 for supporting the charging stand 100.

The stand 200 may include a base 210 supported on a floor and a support 220 provided in the base 210. The support 220 may be detachably coupled to the charging stand 100.

A lower end of the support 220 is connected to the base 210 and an upper end of the support 220 is connected to the charging stand 100. The upper end of the support 220 may be connected to the charging stand 100 on a vertically lower side of the center of gravity (G) of the charging stand 100. Accordingly, the support 220 may stably support the charging stand 100.

An electric wire 114 for supplying electric power may be provided in the first body 110. The electric wire 114 may extend from a rear surface 111 of the first body 110.

A connection terminal 117 to which the electric wire 114 is connected may be provided in the first body 110. One end of the electric wire 114 may be connected to the first body 110 through the connection terminal 117.

The first charging port 113 and the second charging port 131 are connected to the connection terminal 117. Accordingly, electric power applied through the electric wire 114 may be supplied to the first charging port 113 and the second charging port 131.

The connection terminal 117 may be provided on the rear surface 111 of the first body 110. Further, the connection terminal 117 may be arranged between the first charging port 113 and the second charging port 131. That is, the connection terminal 117 may be arranged below the first charging port 113, and the second charging port 131 may be arranged below the connection terminal 117.

A power plug (not illustrated) may be connected to the other end of the electric wire 114. The power plug may be connected to a socket and the like to receive external electric power.

The electric wire 114 may be coupled to the support 220. In detail, the electric wire 114 is connected to a rear surface of the support 220 to extend toward the base 210. A member for fixing the electric wire 114 may be provided on the rear surface of the support 220.

The electric wire 114 may extend to an inside of the base 210 through an upper end of the base 210 and may extend to an outside of the base 210 through a side surface or a bottom surface of the base 210 again.

A cord reel (not illustrated) on which the electric wire 114 is wound may be provided in the base 210. In detail, the cord reel may be provided inside the base 210. Thus, the user may adjust an extending length of the electric wire 114 as needed.

The base 210 may include an inclined surface 213 on which the suction nozzle 340 of the cleaner 300 is held and a stopper 215 for preventing the suction nozzle 340 of the cleaner 300 from being separated therefrom.

The stopper 215 may protrude from an end of the inclined surface 213. The stopper 215 serves to support the suction nozzle 340 such that a state in which the suction nozzle 340 is stably seated on the base 210 may be maintained.

Meanwhile, a dust collector (not illustrated) may be provided in the first body 110. The dust collector may communicate with the dust container 315 provided in the cleaner body 310. Dust collected in the dust container 315 may be moved to the dust collector by suction force generated by a suction motor of the cleaner body 310 or suction force generated by a separate device provided in the dust collector. Because the dust collected in the dust container 315 does not need to be directly emptied due to the dust collector, user's convenience may be improved.

A spaced member (not illustrated) for maintaining a predetermined distance between the first body 110 and the wall surface may be provided on the rear surface 111 of the first body 110. The spaced member may extend rearward from the rear surface 111 of the first body 110. The first body 110 may be prevented from colliding with the wall surface by external force, due to the spaced member.

Fixing parts 115*a* and 115*b* for fixing the charging stand 100 to the wall surface or the like may be provided on the rear surface 111 of the first body 110. Accordingly, the charging stand 100 may be fixed to the wall surface while being separated from the support 220 (see FIG. 23). The fixing parts 115*a* and 115*b* may have a hole or groove shape. Accordingly, nails or the like, which are installed on the wall surface, are inserted into the fixing parts 115*a* and 115*b*, so that the first body 110 may be fixed to the wall surface.

Hereinafter, a method for coupling the cleaner 300 to the holder 10 will be described.

Figure 6A:
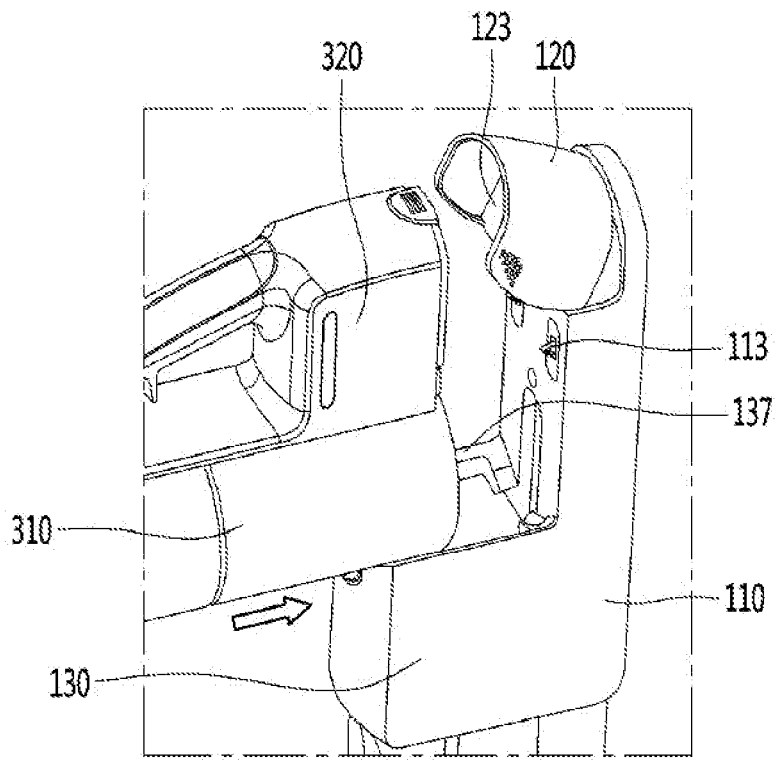
FIG. 6A is a view illustrating a state in which the cleaner is coupled to a support part.
Figure 6B:
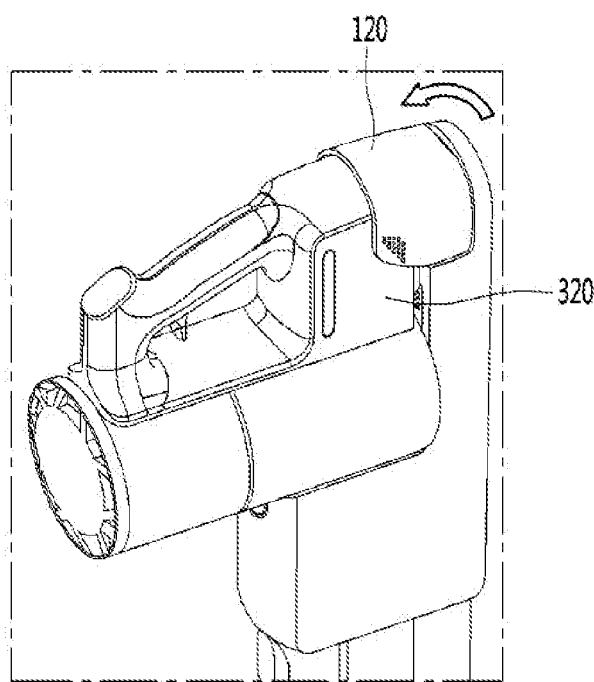
FIG. 6B is a view illustrating a state in which a locking part is coupled to the cleaner.

FIG. 6 is a view illustrating a state in which a cleaner is held on a cleaner holder. In detail, FIG. 6A illustrates a state in which the cleaner is guided by a cleaner guide, and FIG. 6B illustrates a state in which a locking part is coupled to the cleaner.

Referring to FIG. 6, the cleaner body 310 may be moved forward/rearward along the cleaner guide 137 while being supported by the support guide 137. Accordingly, the cleaner body 310 may selectively come into contact with the first charging port 113.

The locking part 120 may be rotatably connected to the first body 110 within a predetermined angle. FIG. 6A illustrates a state in which the locking part 120 is maximally rotated rearward (in a clockwise direction in FIG. 6A).

The first body 110 may include an elastic member (not illustrated) for applying elastic force to the locking part 120. In a state in which the locking part 120 is rotated rearward, the elastic member (not illustrated) may apply elastic force to a rear side thereof such that a state in which the locking part 120 is rotated rearward is maintained.

The locking part 120 may include a push part 123. The push part 123 may be provided inside the locking part 120. The push part 123 may be pressed by the battery housing 320 while the cleaner body 310 is moved along the guide 137.

When the push part 123 is pressed by the battery housing 320, the locking part 120 may be operated.

In detail, when the locking part 120 is operated, the locking part 120 may be rotated forward (in a counterclockwise direction in FIG. 6B) to be coupled to the outer peripheral surface of the battery housing 320. Accordingly, the locking part 120 may cover at least a portion of the battery housing 320.

When the locking part 120 is rotated forward, the elastic member (not illustrated) may apply elastic force such that a state in which the locking part 120 is rotated forward is maintained. Accordingly, the locking part 120 may serve to fix the battery housing 320 to the first body 110.

Hereinafter, detailed descriptions and operational principles of the locking part 120 will be described.

Figure 8:
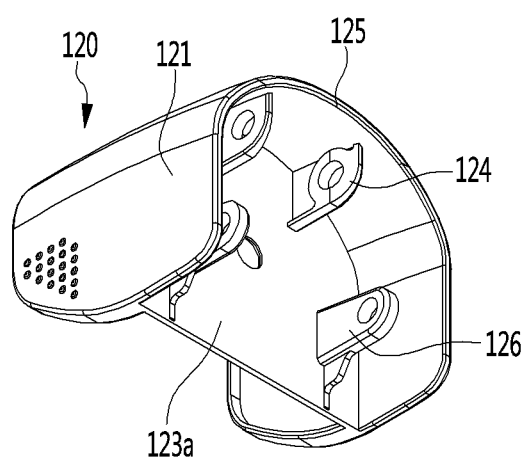
FIG. 8 is a view illustrating a rear surface of the locking part.

FIG. 7 is a view illustrating a state in which the locking part is separated from the first body, and FIG. 8 is a view illustrating a rear surface of the locking part.

Referring to FIGS. 7 to 8, the locking part 120 includes a cover part 121 and a push part 123. The cover part 121 may have an arc shape, and the push part 123 may be connected to a bottom surface of the cover part 121.

When the locking part 120 is coupled to the cleaner 300, the cover part 121 surrounds at least a portion of the battery housing 320 of the cleaner 300.

First hinges 124 rotatably coupled to the first body 110 are provided on a rear surface 123a of the push part 123.

The first hinges 124 are hinge-coupled to hinge-coupling parts 1104 provided in the first body 110. Accordingly, the locking part 120 may be rotated about the first hinges 124 in a vertical direction. As illustrated, the pair of first hinges 124 are provided.

A rotational range of the locking part 120 in an upward direction thereof may be restrained by a rear end 125 of the locking part 120. That is, when the locking part 120 is upward rotated by a predetermined angle, the rear end 125 of the locking part 120 comes into contact with one end (upper stopper) of the first body 110, so that the rotational range of the locking part 120 in an upward direction thereof may be restrained.

A front cover 1101 from which the first charging terminals 113 protrude is provided in the first body 110.

A lower stopper 1102 configured to restrain a rotational range of the locking part 120 in a downward direction thereof may be provided on the front cover 1101.

An opening 1103 may be formed in the front cover 1101. A portion of the locking part 120 may be inserted into the opening 1103, to receive resilient force for operating the locking part 120. A link member is provided inside the first body 110, to transfer the resilient force to the locking part 120.

Second hinges 126 connected to the link member are provided on the rear surface 123a of the push part 123. Hereinafter, an operational principle of the locking part 120 will be described in detail.

Figure 9:
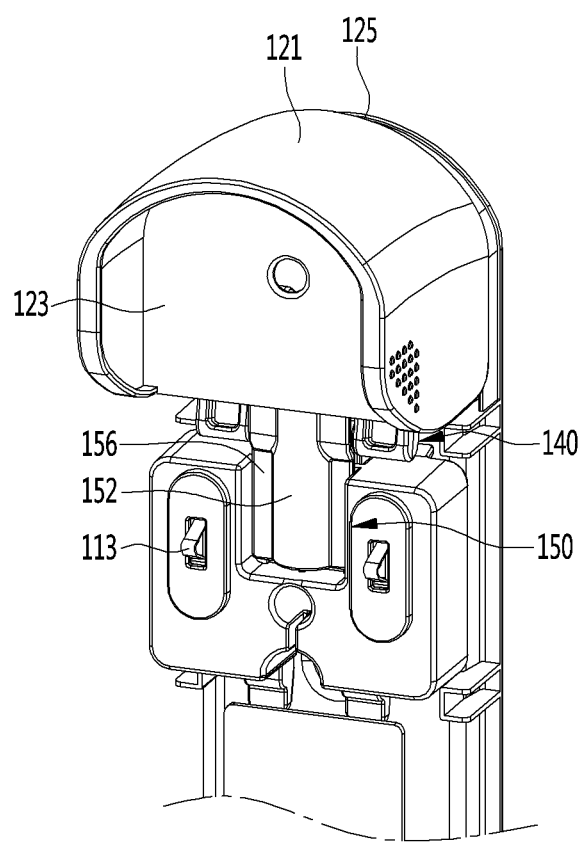
FIG. 9 is a view illustrating a state in which a front cover is separated from the first body.
Figure 10:
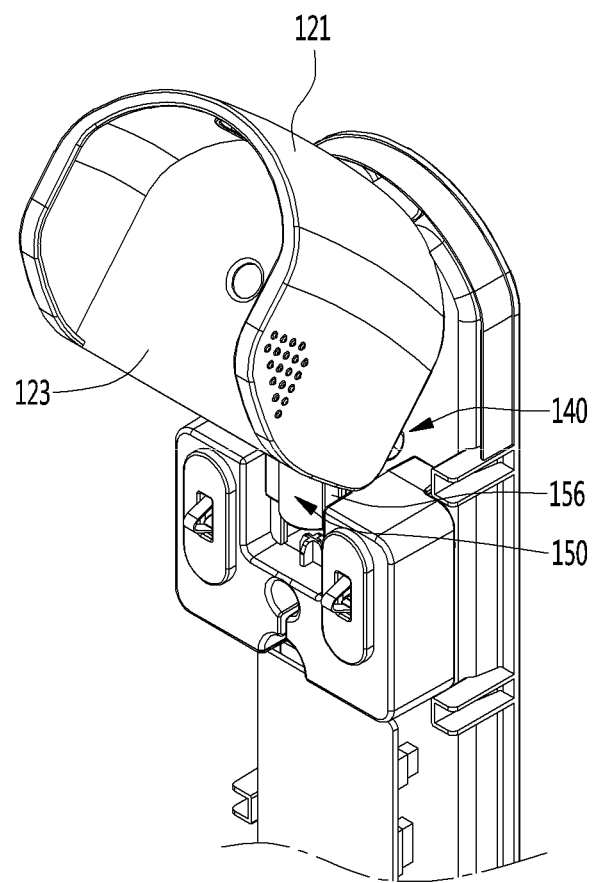
FIG. 10 is a view illustrating a state in which the locking part of FIG. 9 is rotated upward.
Figure 11:
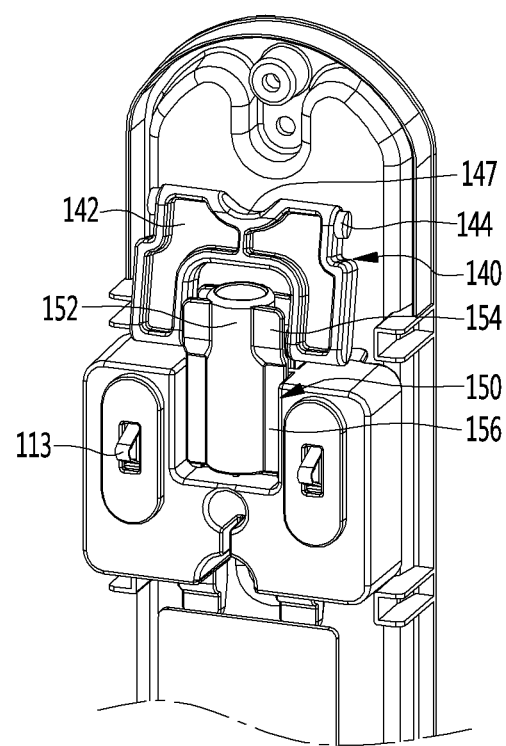
FIG. 11 is a view illustrating a state in which the locking part of FIG. 9 is removed.
Figure 12:
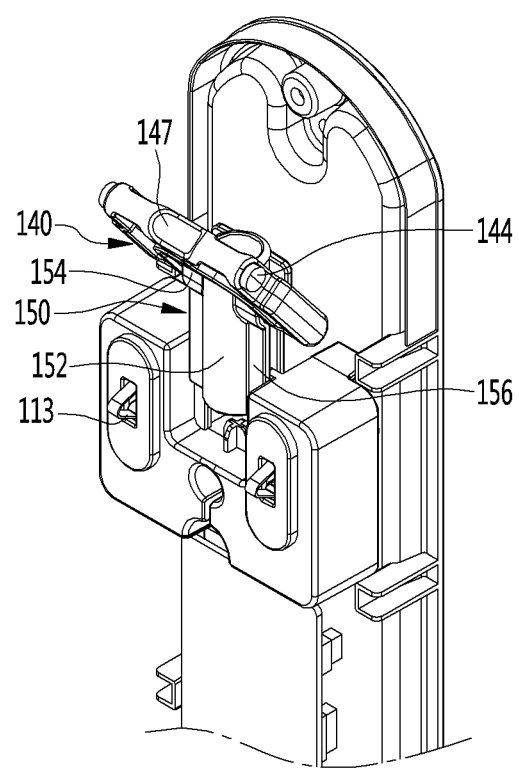
FIG. 12 is a view illustrating the shape of a link member when the locking part is rotated upward.
Figure 13:
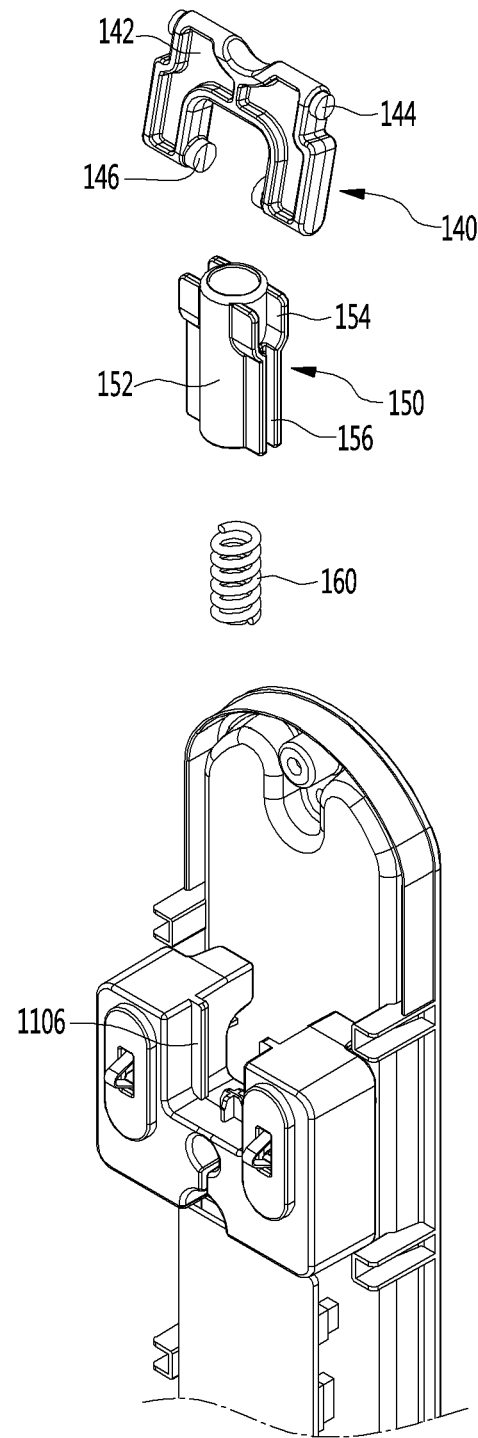
FIG. 13 is an exploded perspective view of FIG. 11.
Figure 14:
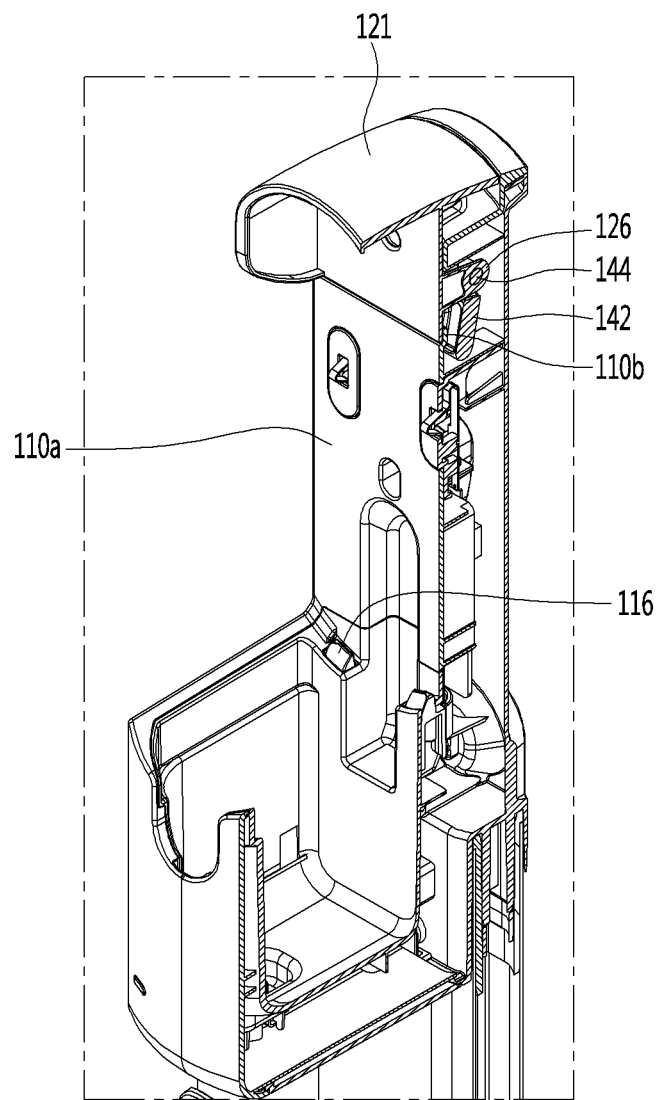
FIG. 14 is a longitudinal sectional view illustrating the holder that is cut such that a cross-section thereof passes through a first link member in a state in which the locking part is closed.
Figure 15:
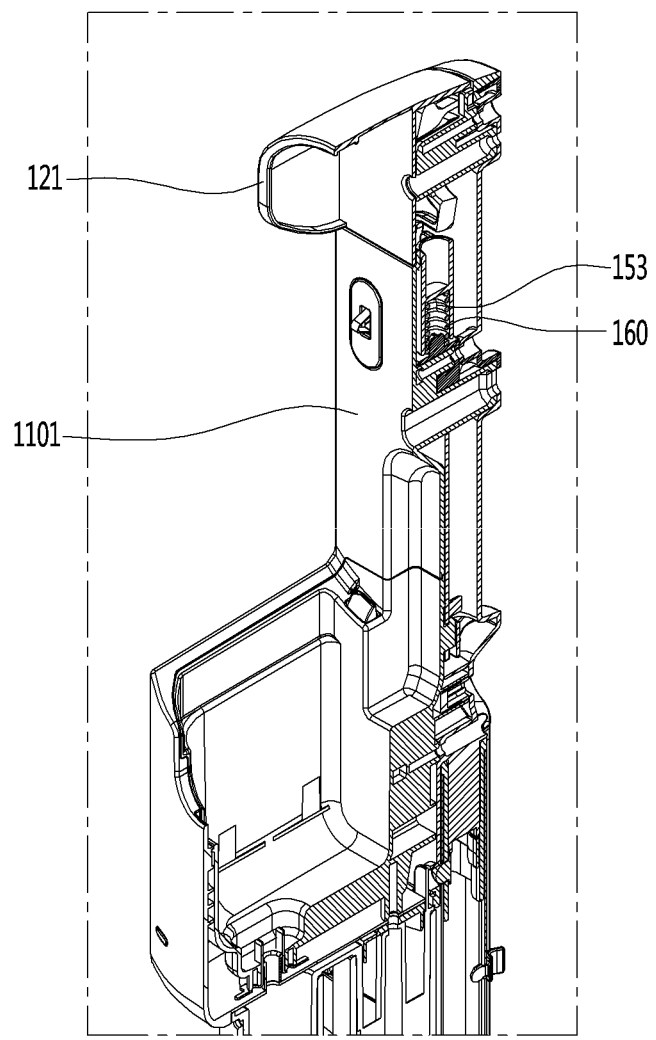
FIG. 15 is a longitudinal sectional view illustrating the holder that is cut such that a cross-section thereof passes through a second link member in a state in which the locking part is closed.
Figure 16:
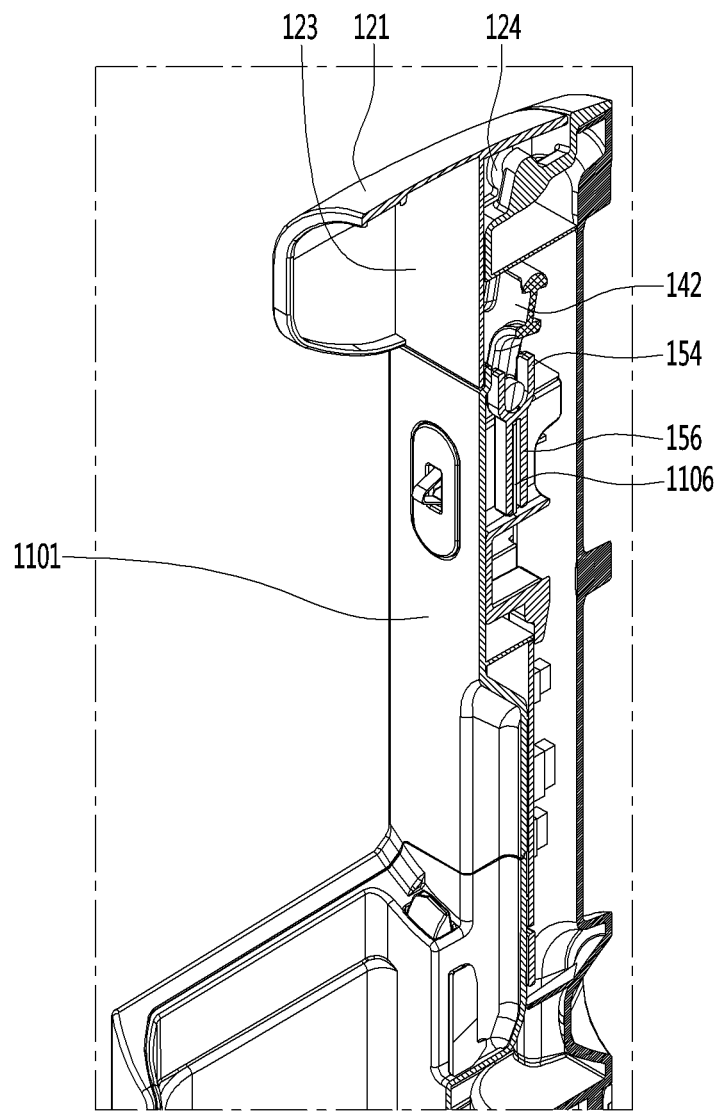
FIG. 16 is a longitudinal sectional view illustrating the holder that is cut such that a cross-section thereof passes through a guide member of the second link member in a state in which the locking part is closed.
Figure 17:
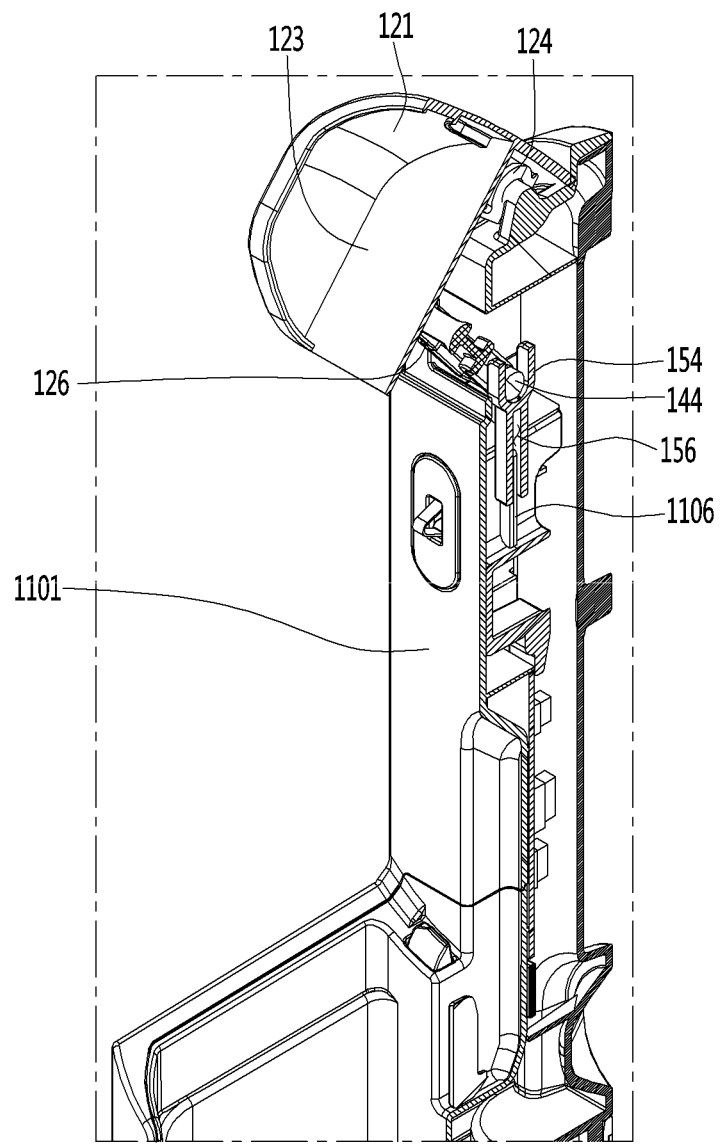
FIG. 17 is a longitudinal sectional view illustrating the holder in a state in which the locking part is opened.

FIG. 9 is a view illustrating a state in which a front cover is separated from a first body, FIG. 10 is a view illustrating a state in which a locking part of FIG. 9 is upward rotated, FIG. 11 is a view illustrating a state in which the locking part of FIG. 9 is removed, FIG. 12 is a view illustrating the shape of the link member in a state in which the locking part is upward rotated, FIG. 13 is an exploded perspective view of FIG. 11, FIG. 14 is a longitudinal sectional view illustrating a charging stand that is cut such that a cross section thereof passes through a first link member in a state in which the locking part is closed, FIG. 15 is a longitudinal sectional view illustrating the charging stand that is cut such that a cross section thereof passes through a second link member in a state in which the locking part is closed, FIG. 16 is a longitudinal sectional view illustrating the charging stand that is cut such that a cross section thereof passes through a guide member of the second link member in a state in which the locking part is closed, and FIG. 17 is a longitudinal sectional view illustrating the charging stand in a state in which the locking part is opened.

Referring to FIGS. 9 to 17, a plurality of link members 140 and 150 connected to the locking part 120 may be provided inside the first body 110.

The plurality of link members 140 and 150 include a first link member 140 connected to the locking part 120 and a second link member 150 connected to the first link member 140.

One side of the first link member 140 is rotatably connected to the locking part 120 and the other side of the first link member 140 is rotatably connected to the second link member 150. The second link member 150 is vertically movably installed inside the first body 110.

The first link member 140 may include a body 142, first hinge shafts 144 provided in the body 142 and rotatably connected to the locking part 120 and second hinge shafts 146 provided in the body 142 and rotatably connected to the second link member 150.

The first hinge shafts 144 may be coupled to the second hinges 126 of the locking part 120. Accordingly, the first link member 140 may be rotated about the locking part 120.

The second link member 150 may include a body 152, coupling grooves 154 provided in the body 152, to which the second hinge shafts 146 of the first link member 140 are coupled, and guide members 156 provided in the body 152 and coupled to the first body 110 to be vertically moved.

The coupling grooves 154 may be upward opened. The second hinge shafts 146 of the first link member 140 may be inserted into the coupling grooves 154 through the opened portion. In this way, the coupling grooves 154 may have an upwardly opened shape, so that the first link member 140 and the second link member 150 may be easily coupled to each other.

Guide ribs 1106 for guiding vertical movement of the second link member 150 may be provided in the first body 110. Further, the guide ribs 1106 may vertically extend. Further, the guide ribs 1106 may be inserted into the guide members 156 of the second link member 150. Accordingly, vertical movement of the second link member 150 may be guided.

Meanwhile, as illustrated, the coupling grooves 154 and the guide members 156 are integrally formed.

A resilient member 160 may be provided below the second link member 150. One side of the resilient member 160 is connected to a lower side of the second link member 150 and the other side of the resilient member 160 is fixed to the first body 110. The resilient member 160 may upward apply resilient force to the second link member 150. Insertion grooves 153 into which at least a portion of the resilient member 160 is inserted may be formed in the second link member 150.

In a state in which the locking part 120 is closed, that is, in a state in which the locking part 120 is maximally rotated downward, the first link member 140 is maintained to be maximally rotated downward. In detail, the first link member 140 may be maintained to be rotated rearward with respect to a movement trajectory of the second link member 150. Thus, even when the resilient member 160 upward applies resilient force to the second link member 150, the second link member 150 is not lifted up.

In contrast, when the locking part 120 is opened, that is, when the locking part 120 is rotated upward, the first hinge shafts 144 of the first link member 140 are moved to a front upper side of the locking part 120 along the locking part 120. Here, the second hinge shafts 144 of the first link member 140 may be moved only in a vertical direction by the second link member 150, is restrained from being forward or rearward, and is thus moved upward. Because the resilient member 160 upward applies resilient force to the second link member 150, the second link member 150 is also lifted up by lifting up the first link member 140.

In a state in which the locking part 120 is maximally rotated upward, a state in which the locking part 120 is opened may be maintained by the resilient force of the resilient member 160. Here, when rotational force having predetermined magnitude is downward applied to the locking part 120, the locking part 120 may returns to a closed state again.

Meanwhile, although not illustrated, a manipulation button (not illustrated) configured to lift up or lower the second link member 150 may be provided in the charging stand 100. A user may manipulate the button to automatically lift up the second link member 150 so as to rotate the locking part 120 such that the locking part 120 is in an opened state or to automatically lower the second link member 150 so as to rotate the locking part 120 such that the locking part 120 is in a closed state.

A manipulation button configured to control rotation of the locking part 120 is named a "first manipulation button" and a manipulation button configured to control the fixing members 116 may be named a "second manipulation button".

Figure 18:
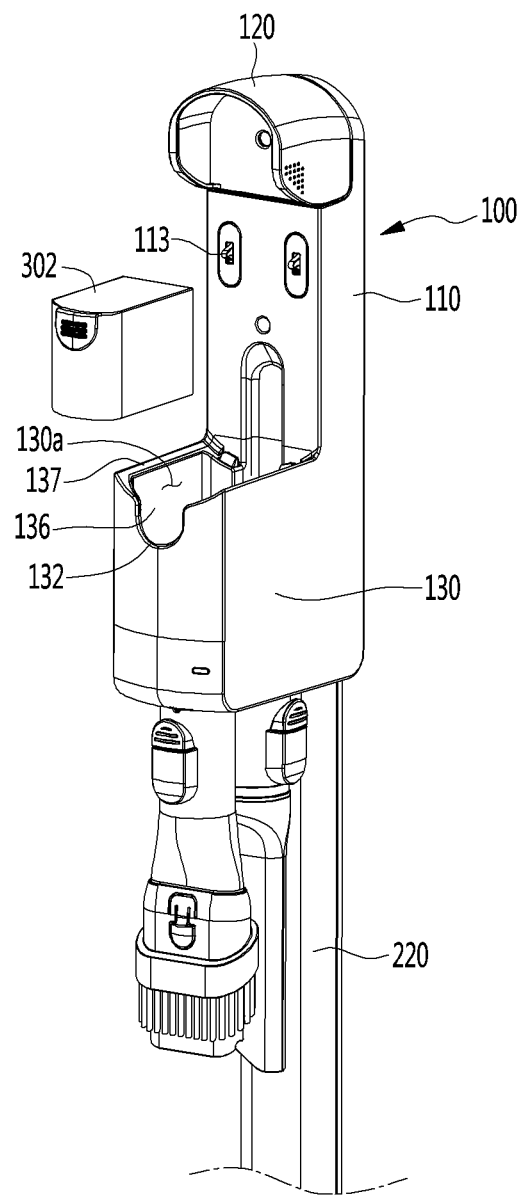
FIG. 18 is a view illustrating a state in which an auxiliary battery is separated from the holder for the cleaner.
Figure 19:
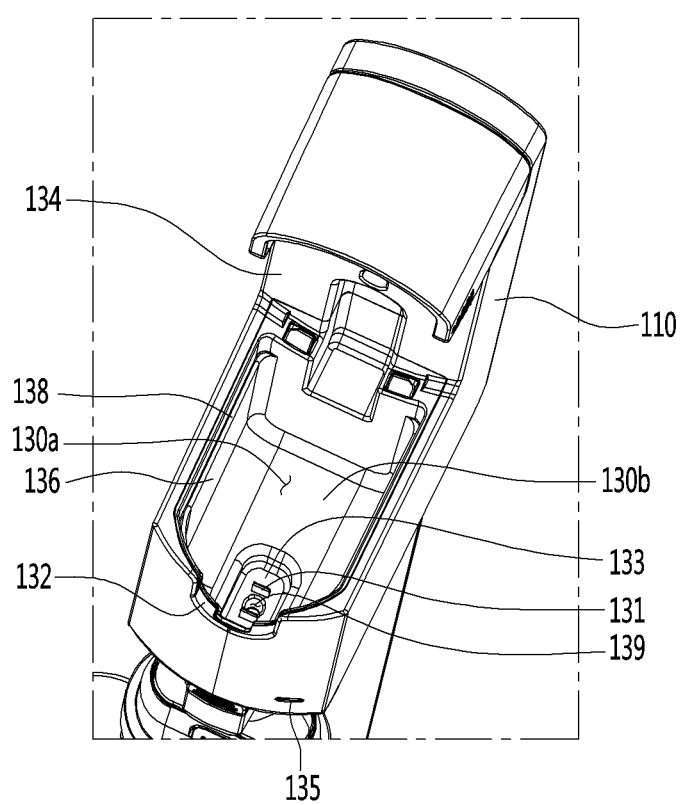
FIG. 19 is a view illustrating an inside of a second body of FIG. 18.
Figure 20:
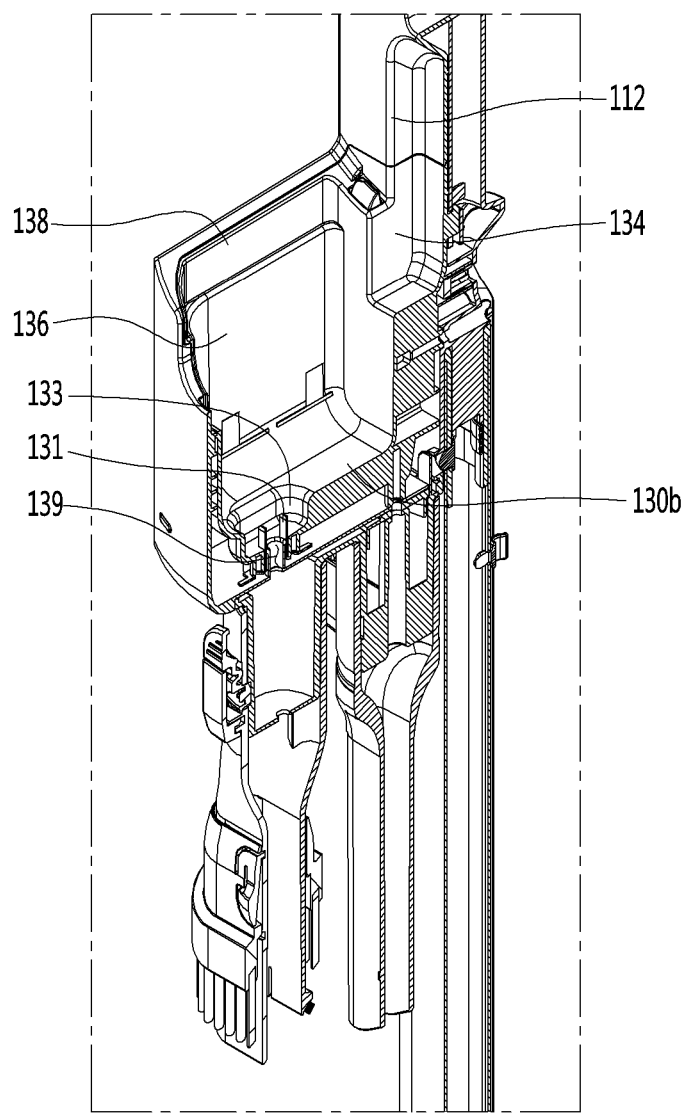
FIG. 20 is a cross-sectional view illustrating a charging stand.

FIG. 18 is a view illustrating a state in which an auxiliary battery is separated from a charging stand for a cleaner, FIG. 19 is a view illustrating an inside of a second body of FIG. 18, and FIG. 20 is a longitudinal sectional view illustrating the charging stand. Referring to FIGS. 18 to 20, a battery accommodating space 130*a* for accommodating the auxiliary battery 302 is formed in the second body 130. The battery accommodating space 130*a* may be downward recessed in an upper surface of the second body 130.

Referring to FIGS. 18 to 20, a battery accommodating space 130*a* for accommodating the extra battery 302 is formed in the second body 130. The battery accommodating space 130*a* may be downward recessed in an upper surface of the second body 130.

The second charging port 131 for charging the extra battery 302 is provided inside the second body 130. The second charging port 131 may be arranged to be lower than the first charging port 113. The second charging port 131 may be selectively in contact with the extra battery 302 accommodated in the second body 130.

A recessed part 133 in which the second charging port 131 is provided may be provided in the second body 130.

The recessed part 133 may be recessed downward from the bottom surface of the second body 130. The second charging port 131 may be provided on a bottom surface of the recessed part 133 and may protrude upward from the bottom surface of the recessed part 133.

A length in which the second charging port 131 protrudes upward may be smaller than a depth of the recessed part 133. Accordingly, an upper end of the second charging port 131 may be arranged lower than the bottom surface 130*b* of the battery accommodating space 130*a*. That is, because the second charging port 131 is accommodated in the recessed part 133, damage of the second charging port 131 by external force may be minimized.

Grooves 132, 134 and 112 for allowing the user to easily grip the extra battery 302 accommodated in the battery accommodating space 130*a* may be formed on one side of the battery accommodating space 130*a*. The user may grip a lateral side of the extra battery 302 through the grooves 132, 134 and 112. The grooves 132, 134 and 112 may include a first groove 132 provided in front of the battery accommodating space 130*a* and a second groove 134 and a third groove 112 provided on a rear side of the battery accommodating space 130*a*.

The first groove 132 may have a shape that is cut downward from an upper end of a front surface of the second body 130.

The second groove 134 may have a shape that is cut downward from an upper end of a rear surface of the second body 130. Thus, the second groove 134 is connected to the battery accommodating space 130*a*. Further, the second groove 134 may be arranged to face the first groove 132.

The third groove 112 is recessed such that a finger of the user is inserted into the third groove 112 to come into contact with the second coupling part 134. In detail, the third groove 112 may be provided in the first body 110 and may be recessed rearward from the first body 110. Further, the third groove 112 may extend upward and downward to at least partially overlap the battery accommodating space 130*a*. Further, the third groove 112 may be connected to the second groove 134. Thus, the second groove 134 may connect the third groove 112 and the battery accommodating space 130*a* to each other. As illustrated, the third groove 112 may constitute one groove together with the second groove 134.

The second body 130 may further include a display unit 135 for displaying a residual amount of the extra battery 302. Unlike the one illustrated, the display unit 135 may be provided in the first body 110.

The display unit 135 may include a light emitting diode (LED) light that may display various colors. As an example, the display unit 135 may display the residual amount of the extra battery 302 in three stages. In detail, the display unit 135 may divide the residual amount of the extra battery 302 into upper, middle and lower parts, and may display different colors depending on the stages. Further, the display unit 135 may notify the user of the charging state as the display unit 135 flickers during charging of the extra battery 302.

The battery guide 136 for guiding the extra battery 302 may be provided below the cleaner guide 137 and may extend downward.

The battery guide 136 may have a shape corresponding to the extra battery 302. Accordingly, a location of a terminal of the extra battery 302 inserted into the second body 130 may be accurately aligned with the location of the second charging port 131. Although not illustrated, a boss or groove for effectively guiding the insertion or the withdrawal of the extra battery 302 may be formed in the battery guide 136.

An entrance 138 through which the extra battery 302 is introduced/withdrawn may be provided in the battery guide 136. The entrance 138 may be provided on the battery guide 136 and may extend upward to have a predetermined height. Accordingly, an upper end of the entrance 138 may be arranged higher than an upper end of the extra battery 302 accommodated in the battery accommodating space 130*a*.

An inner peripheral surface of the entrance 138 may be stepped to the battery guide 136 to facilitate the insertion of the extra battery 302. In detail, the inner peripheral surface of the entrance 138 may be wider than an inner peripheral surface of the battery guide 136. Accordingly, a seating part 1382 may be formed at a boundary between the entrance 138 and the battery guide 136 and the step 3028 of the extra battery 302 may be seated on the seating part 1382.

In this way, because the battery guide 136 has a shape corresponding to the extra battery 302, it is difficult to directly insert the extra battery 302. However, as the entrance 138 has a wider width than the battery guide 136, the extra battery 302 may be easily inserted.

A drainage hole 139 may be provided in the second body 130. The drainage hole 139 may be formed on a bottom surface of the second body 130 to communicate with an external space. The drainage hole 139 is for preventing liquid, such as water, introduced into the second body 130 from being collected inside the second body 130. Accordingly, the second charging port 131 may be prevented from being damaged by the liquid such as water.

The drainage hole 139 may be provided in the recessed part 133 and may be arranged adjacent to the second charging port 131. Accordingly, the liquid such as water, which is collected near the second charging port 131, may be directly discharged. Further, the drainage hole 139 may be plural, unlike the one illustrated.

Figure 21:
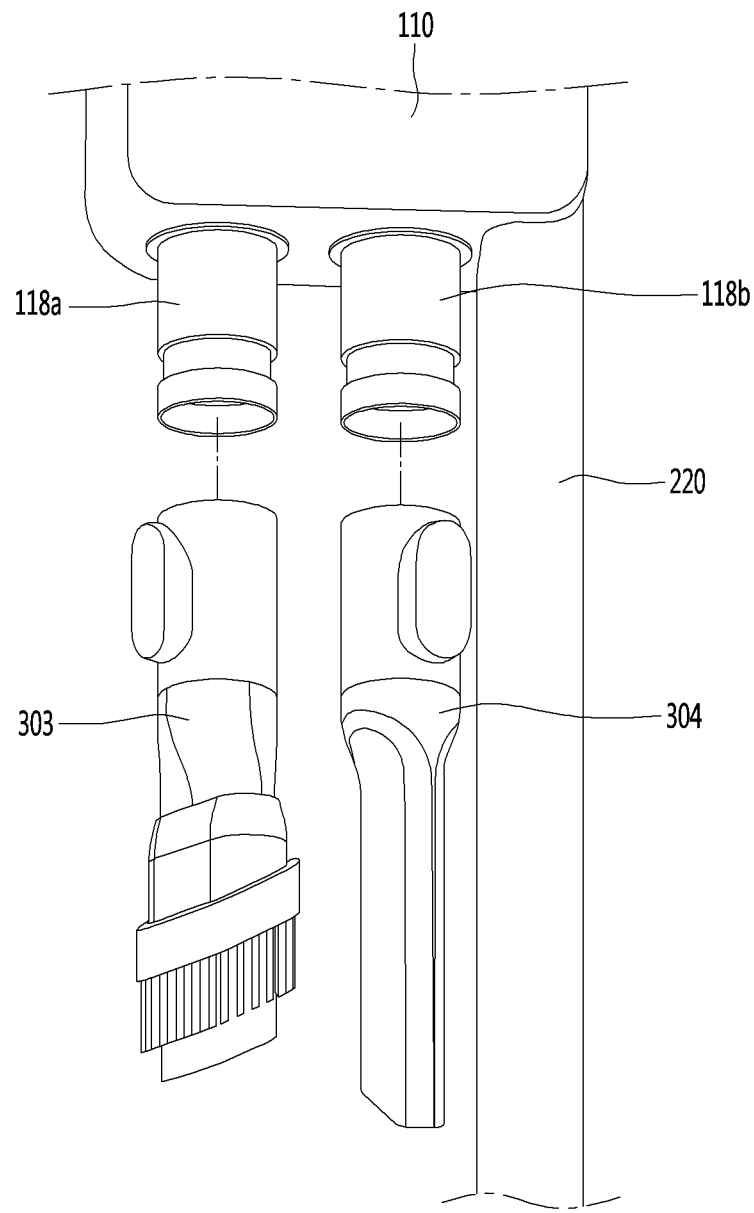
FIG. 21 is a view illustrating a state in which a nozzle is separated from the charging stand.

FIG. 21 is a view illustrating a state in which a nozzle is separated from a charging stand.

Referring to FIG. 21, the first body 110 may include connectors 118*a* and 118*b* to which the extra nozzles 303 and 304 are selectively coupled. The connectors 118*a* and 118*b* may extend from one side of the first body 110.

The user may attach/detach the nozzles 303 and 304 to the connectors 118*a* and 118*b* as needed. Accordingly, because the extra nozzles 303 and 304 are easily stored and used, user convenience may be improved.

Figure 22:
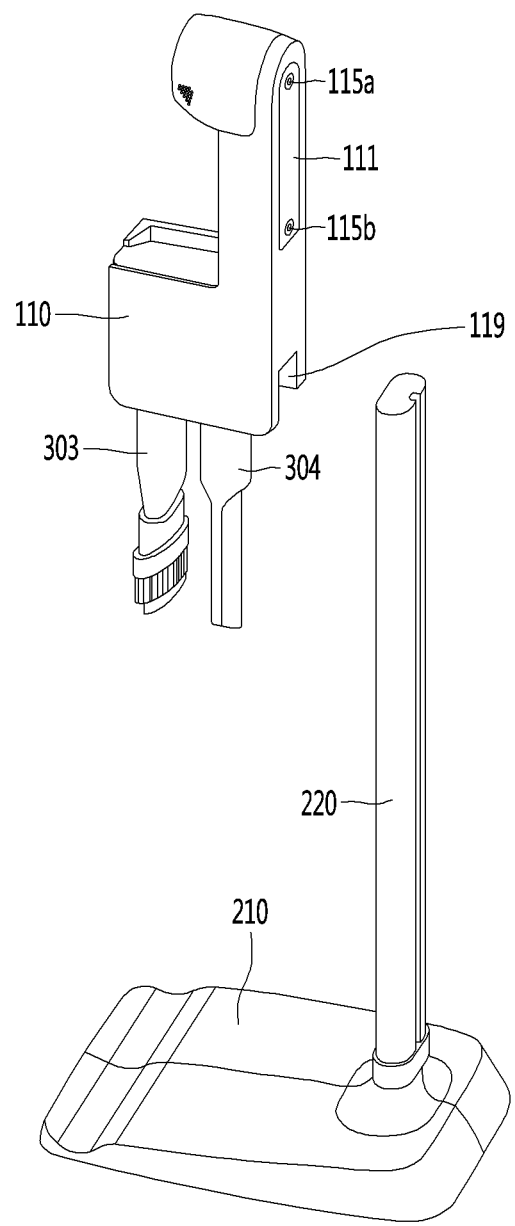
FIG. 22 is a view illustrating a state in which the charging stand is separated from a stand.
Figure 23:
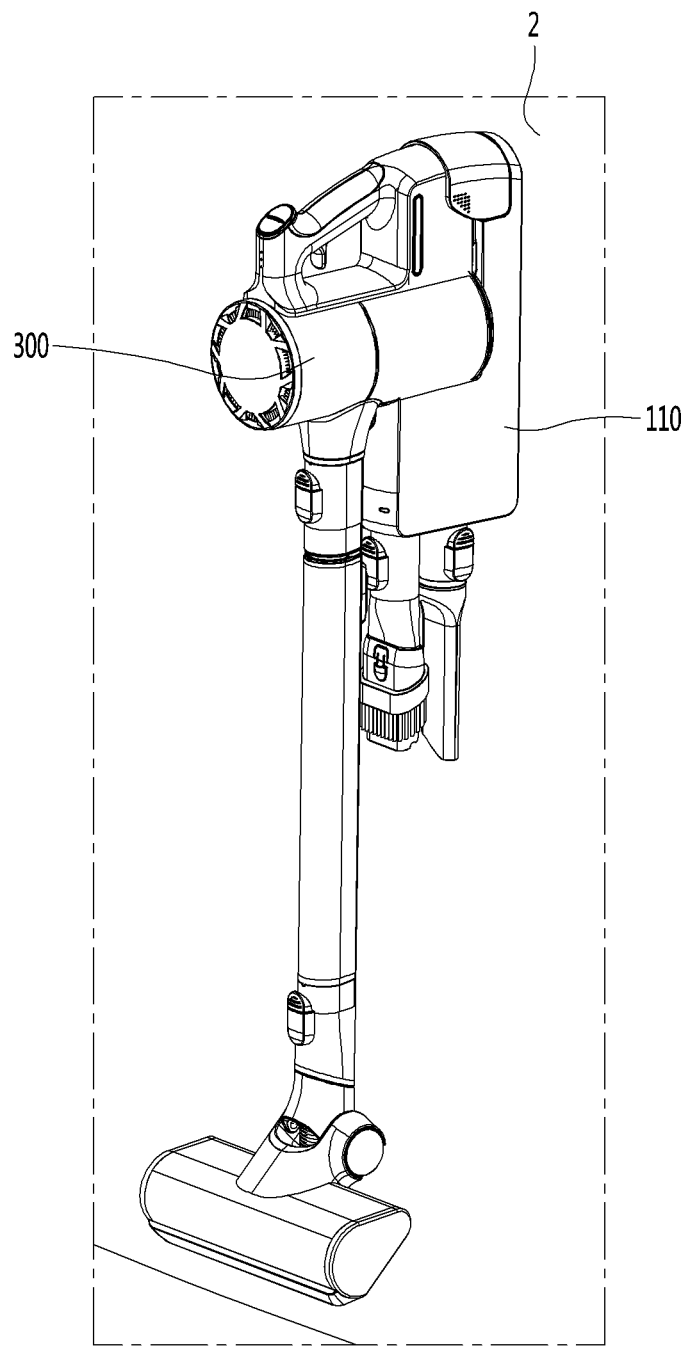
FIG. 23 is a view illustrating a state in which the charging stand on which the cleaner is held is mounted on a wall surface.

FIG. 22 is a view illustrating a state in which the charging stand is separated from the support, and FIG. 23 is a view illustrating a state in which the charging stand on which the cleaner is held is mounted on a wall surface.

Referring to FIGS. 22 and 23, the cleaning stand 100 may include a coupling part 119 to which the support 220 is coupled. The coupling part 119 may be provided in the first body 110. The support 220 may be detachably coupled to the coupling part 119. Accordingly, the user may easily separate the charging stand 100 and the support 220 from each other.

As needed, the user may fix the charging stand 100 from which the support 220 is separated to a wall surface 2 using the fixing parts 115*a* and 115*b*.

Figure 24:
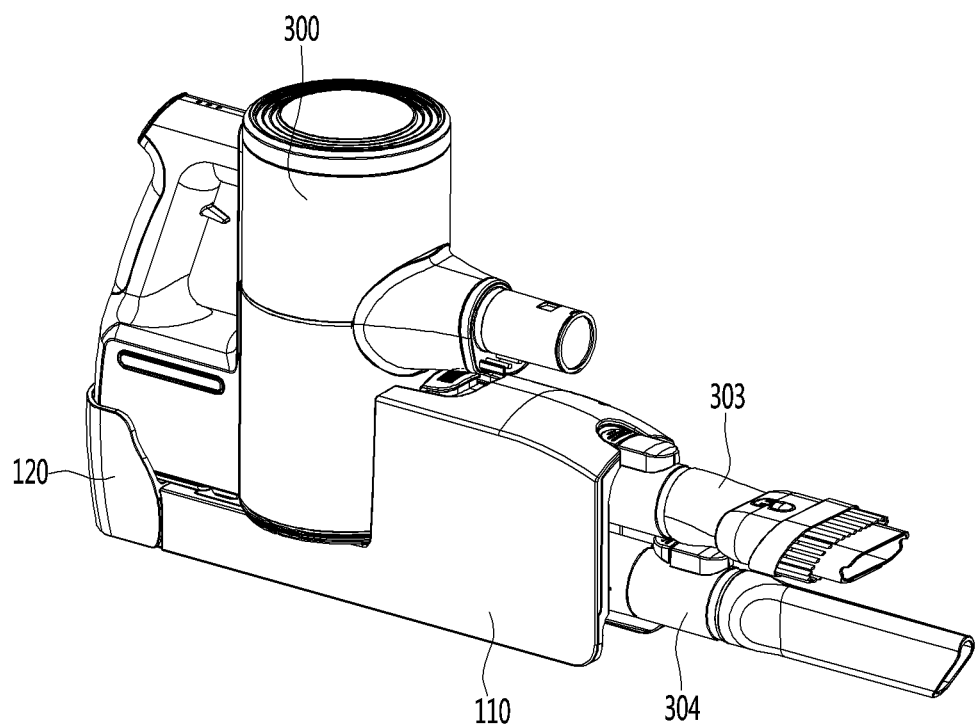
FIG. 24 is a view illustrating a state in which a charging stand is supported by a floor.

FIG. 24 is a view illustrating a state in which the charging stand is supported by the floor.

Referring to FIG. 24, the rear surface 111 of the charging stand 100 may be supported by the floor. To achieve this, the rear surface 111 of the charging stand 100 may have a planar shape.

The cleaner 300 may be seated and held on the first body 110, and the locking part 120 may be coupled to a lateral side of the cleaner 300 to fix the cleaner 300.

In this way, because the charging stand 100 may be held in various schemes according to a usage situation, user convenience may be improved.

A holder for a cleaner according to the present disclosure may include: a charging stand having charging terminals configured to charge a battery for a cleaner; a locking part rotatably provided in the charging stand and coupled to the cleaner to fix the cleaner; and a cleaner guide provided in the charging stand to guide the cleaner such that the cleaner is connected to the charging terminal.

A push part configured to operate the locking part when being pressed by external force may be provided in the locking part.

While the cleaner is guided toward the charging terminals by the cleaner guide, the push part may be pressed by the cleaner.

A battery accommodating space in which a battery may be accommodated may be provided in the charging stand.

Grooves may be provided on one side of the battery accommodating space such that a user may easily hold the battery.

Connectors configured to fix accessories may be provided in the charging stand.

Fixing parts for fixing to a wall surface may be provided on a rear surface of the charging stand.

The holder may further include a stand configured to support the charging stand.

The stand may include a base supported on a floor and a support extending from the base and detachably connected to the charging stand.

An electric wire connected to the charging stand may be fixed to the support.

An inclined surface on which suction nozzles for the cleaner are held and a stopper configured to prevent separation of the suction nozzles may be formed in the base.

According to an embodiment of the present disclosure, the locking part is coupled to a battery housing for the cleaner regardless of a second body configured to hold the cleaner, so that the cleaner may be stably held.

Further, the charging stand for a cleaner according to the present disclosure has an advantage in that when the push part of the locking part is pressed while the cleaner is guided by the cleaner guide, the locking part may be coupled to the cleaner through rotation, so that the cleaner may be easily fixed.

Further, in the charging stand for a cleaner according to the present disclosure, a plurality of link members and a resilient member are connected to the locking part, and thus a state in which the locking part is opened or closed may be maintained, so that user convenience may be improved.

Further, in the charging stand for a cleaner according to the present disclosure, the battery housing is fixed using the locking part, fixing bosses are coupled to a dust container for the cleaner, and thus an upper side and a lower side of the cleaner may be simultaneously fixed, so that the cleaner may be fixed more stably.

Further, the fixing bosses are resiliently supported by resilient parts and are thus easily inserted into fixing grooves for the cleaner, and the fixing bosses may be separated from the cleaner by a manipulation button, so that it is easy to mount or separate the cleaner to or from the charging stand for the cleaner.

What is claimed is:

1. A cleaner holder, comprising:
   a first body comprising a charging port configured to charge a cleaner;
   a second body configured to support the cleaner, wherein the second body is connected to the first body and comprises a battery accommodation space configured to hold a battery detached from the cleaner;
   a locking part located on the first body and configured to attach to a battery housing of the cleaner to secure the cleaner;
   a fixing member located on the second body and configured to attach to a dust container of the cleaner to secure the cleaner; and
   a cleaner guide located on the second body and configured to support the dust container of the cleaner and guide movement of the cleaner during mounting of the cleaner to the cleaner holder,
   wherein a top surface of the battery accommodated in the battery accommodation space is positioned lower than the cleaner guide and the fixing member.

2. The cleaner holder of claim 1, wherein the locking part is rotatably connected to the first body and configured to attach to the battery housing of the cleaner to secure the cleaner.

3. The cleaner holder of claim 1, wherein the first body further comprises:
   a first an upper stopper configured to limit a rotation range of the locking part in a first rotating direction of the locking part; and
   a second a lower stopper configured to limit the rotation range of the locking part in a second rotating direction of the locking part.

4. The cleaner holder of claim 1, wherein the locking part overlaps at least a portion of the battery accommodation space in a vertical direction in a state in which the locking part is attached to the battery housing of the cleaner to secure the cleaner.

5. The cleaner holder of claim 1, wherein the battery accommodation space is recessed downward from an upper surface of the battery accommodation space.

6. The cleaner holder of claim 1, wherein the fixing member is disposed between the battery accommodation space and the first body.

7. The cleaner holder of claim 1, wherein the first body comprises a recessed part recessed rearward from a front surface of the first body and in communication with the battery accommodation space.

8. The cleaner holder of claim 1, wherein the charging port is positioned lower than the locking part.

9. The cleaner holder of claim 1, wherein the fixing member comprises a first fixing member and a second fixing member spaced apart from the first fixing member in a horizontal direction.

10. The cleaner holder of claim 1, further comprising a stand connected to a lower side of the first body and configured to support the first body.

11. The cleaner holder of claim 10, wherein the stand comprises a base configured to be supported by a floor and a support that connects the base to the first body.

* * * * *